(12) United States Patent
Ramberg et al.

(10) Patent No.: US 7,038,592 B2
(45) Date of Patent: May 2, 2006

(54) METHOD AND DEVICE FOR DETECTING PHYSICAL BOTTOM CONTACT FOR OBJECTS ON A SEA BOTTOM

(75) Inventors: Kjell Ramberg, Tønsberg (NO); Bjørn Faber, Vestskogen (NO)

(73) Assignee: Simrad AS, Horten (NO)

( * ) Notice: Subject to any disclaimer, the term of this patent is extended or adjusted under 35 U.S.C. 154(b) by 105 days.

(21) Appl. No.: 10/451,455

(22) PCT Filed: Dec. 20, 2001

(86) PCT No.: PCT/NO01/00504

§ 371 (c)(1),
(2), (4) Date: Dec. 1, 2003

(87) PCT Pub. No.: WO02/057130

PCT Pub. Date: Jul. 25, 2002

(65) Prior Publication Data

US 2004/0079020 A1     Apr. 29, 2004

(30) Foreign Application Priority Data

Dec. 21, 2000   (NO) ................................. 20006537

(51) Int. Cl.
*G08B 21/00* (2006.01)

(52) U.S. Cl. ..................... 340/686.6; 340/984; 73/796; 114/230.21

(58) Field of Classification Search ............. 340/686.6, 340/686.1, 668, 984; 73/796, 184; 114/294, 114/230.21
See application file for complete search history.

(56) References Cited

U.S. PATENT DOCUMENTS

| | | | | |
|---|---|---|---|---|
| 2,507,986 A | * | 5/1950 | Liss | 200/61.44 |
| 2,975,397 A | * | 3/1961 | Edgerton | 367/134 |
| 3,418,627 A | * | 12/1968 | Lyons | 340/986 |
| 3,579,182 A | * | 5/1971 | Schneider | 340/986 |
| 3,859,490 A | * | 1/1975 | Fohey | 340/984 |
| 4,873,523 A | * | 10/1989 | Jones | 340/984 |

* cited by examiner

*Primary Examiner*—Toan N. Pham
(74) *Attorney, Agent, or Firm*—Henry C. Query, Jr.

(57) ABSTRACT

A method and a device for detection of physical or approximately physical bottom contact for objects, for instance fishing tackles, which are dragged closely above or on a sea bottom, said method consisting of sensoring an alteration of a force acting on a tension sensor (4) as a consequence of a mass (7) coupled to the tension sensor (4) coming into physical contact with the bottom, said alteration being used as indication of bottom contact, and that frictional forces (F2) being due to the dragging of the mass (7) along the bottom mainly are taken up by means of a tension release means (8). The device comprise the mass (7) being suspended in a tension sensor (4) in such a manner that the sensor (4) is actuated by bottom contact, and at least one tension release means (8) connected to the mass (7) and adapted to take up forces caused by dragging of the mass above the bottom.

12 Claims, 1 Drawing Sheet

METHOD AND DEVICE FOR DETECTING PHYSICAL BOTTOM CONTACT FOR OBJECTS ON A SEA BOTTOM

BACKGROUND OF THE INVENTION

When fishing near or on the sea bottom, it may be very important to know the distance between the fishing tackle and the sea bottom.

For pelagic tackles, this may be very important in order to avoid bottom contact. For tackles constructed for fishing on the bottom, correct bottom contact will be crucial for fishing efficiency.

A known technique for determining the distance between the tackle and the sea bottom is to use an echo sounder which is attached to the tackle and which measures the distance to the bottom. However, very short distances which gradually lead to physical bottom contact may be difficult to detect with great reliability with an echo sounder because the echoes from the tackle and the bottom may be difficult to distinguish. In addition, echo sounders for this purpose tend to be very complicated and expensive.

It is previously known from U.S. Pat. No. 4,873,523 to use a weight at the end of a rope which is kept taut when the weight is not in contact with the bottom but which becomes slack when the weight hits the bottom, which event is recorded by the surface vessel. However, this principle of detection is not reliable when dragging tackle above the bottom because the frictional forces between the weight and the bottom may now and then cause tension in the rope.

The present invention eliminates this source of error.

SUMMARY OF THE INVENTION

The present invention relates to a method and a device for detecting the physical or approximate physical bottom contact for objects, for instance fishing tackles, which are dragged closely above or on the sea bottom.

The method of the present invention is characterized by sensing an alteration of a force acting on a tension sensor as a consequence of a mass which is coupled to the tension sensor coming into physical contact with the sea bottom, wherein the alteration is used as indication of bottom contact. In addition, frictional forces due to dragging of the mass along the bottom are mainly taken up by means of a tension release means.

The device of the present invention comprises a mass which is suspended from a tension sensor in such a manner that the sensor is actuated when the mass contacts the sea bottom, and at least one tension release means which is connected to the mass and which is adapted to take up forces caused by dragging the mass along the sea bottom.

Thus, frictional forces which occur when the mass is dragged along the sea bottom are taken up by the tension release means and do not influence the tension sensor of the bottom detector.

Data from the tension sensor can be detected by a signaling device and transmitted to a vessel, for instance by means of hydroacoustical telemetry or through a cable connection.

The invention will be explained in more detail by means of the accompanying Figures, which illustrate examples of the invention.

DETAILED DESCRIPTION OF THE PREFERRED EMBODIMENTS

Figure 1:
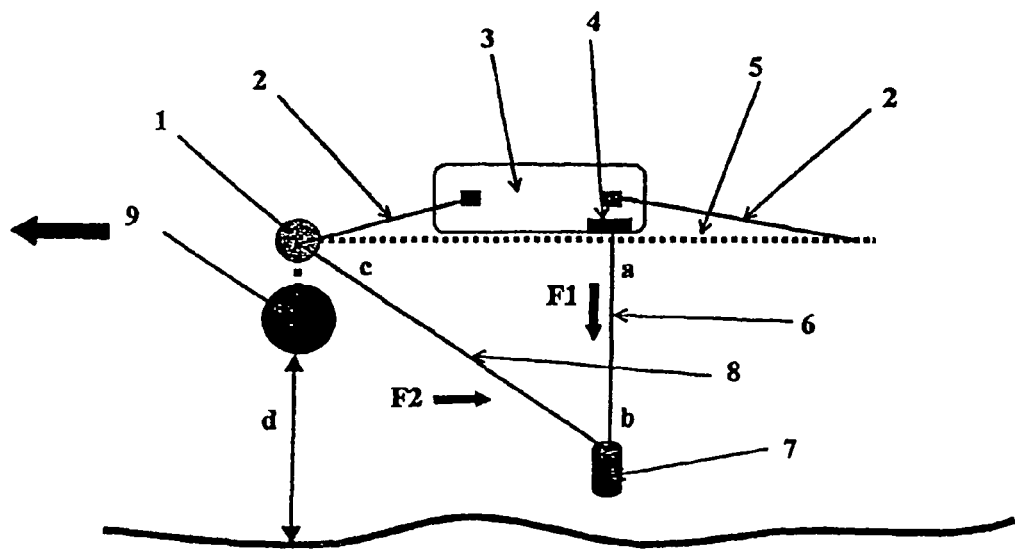
FIG. 1 is a representation of the bottom detector of the present invention showing the fishing tackle suspended above the sea bottom.

FIG. 1 shows a sketch of a portion of a fishing tackle, which is shown in the form of a trawl that is towed slightly above the sea bottom. The trawl includes a trawl net 5 and a number of balls 9 which are attached to a bottom rope 1. In this case, it is desired to detect when the distance d between a ball 9 and the sea bottom is less than a certain value or when the ball 9 is in physical contact with the bottom. Thus, in accordance with the present invention, a bottom detector 3 is attached to the trawl, preferably to the bottom rope 1 and the trawl net 5, by means of a fastener device 2, which maintains the detector 3 in a stable horizontal position. The bottom detector 3 comprises a tension sensor 4 to which is attached a measured length a-b of chain, wire, rope or similar means 6, which will be referred to herein simply as a chain. A tension release means 8 comprising a measured length b-c of chain, wire, rope or similar means is attached to, for instance, the bottom rope 1, preferably by a device similar to the fastener device 2. Thus, the chain 6 and the tension release means 8 have a total length a-b-c. A mass 7 in the form of a weight having a weight adapted to the measuring range of the tension sensor 4 is attached to the chain 6 at the point b. The length a-b of the chain 6 determines the distance that is desired to detect, and this length is such that the mass 7 hangs freely and the force F1 is a maximum when the weight is not in contact with the bottom. When the mass 7 contacts the bottom, the force F1 is reduced, and this reduction is detected by the tension sensor 4.

The release of the weight of the mass 7 and a corresponding reduction of the force F1 when the mass touches the bottom determines the degree of bottom contact. The length b-c of the tension release means 8 is adapted in such a manner that the horizontal force component F2 caused by friction between the mass 7 and the bottom is transferred to the bottom rope 1 through the tension release means 8 as soon as the mass 7 starts touching the bottom. FIG. 1 shows a situation where the mass 7 is hanging straightly down, the triangle a-b-c forms a right triangle and the force F1 is at a maximum.

In order to safeguard the tension sensor 4 against overloading, the chain 6 is attached to the tension sensor through a weak joint, for instance a rope lashing, which is adapted to burst before the tension sensor is subjected to damage.

Figure 2:
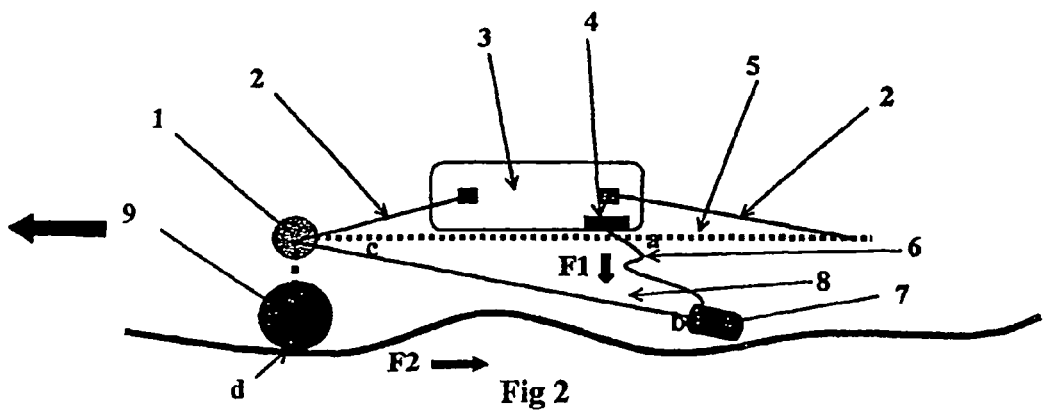
FIG. 2 is a representation of the bottom detector of FIG. 1 showing a portion of the fishing tackle being dragged on the sea bottom.

FIG. 2 shows a sketch of a portion of the fishing tackle being dragged on the sea bottom, i.e., having bottom contact. From the point of time when the mass 7 comes into physical contact with the bottom, the force F1 will be reduced, and this will be recorded with the bottom detector 3, which sends a signal to the vessel. If the distance between the bottom detector 3 and the bottom is further reduced, all of the frictional forces between the bottom and the mass 7 will gradually be transferred to the bottom rope 1, F2 will come to a maximum and F1 will come to a minimum. This will be detected by the tension sensor 4, which sends a signal about the maximum bottom contact to the vessel. By transferring most or all of the frictional forces caused by dragging the mass 7 on the bottom to the bottom rope 1 instead of to the tension sensor 4, measurement errors and erroneous interpretations will be avoided.

Figure 3:
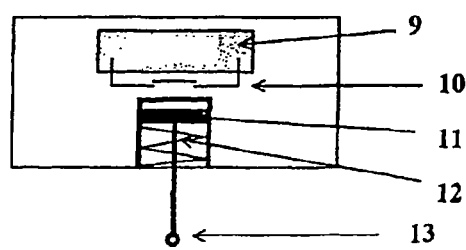
FIG. 3 is a representation of the sensor component of the bottom detector of the present invention.

FIG. 3 shows a representation of the tension sensor 4, a primary object being to provide a water-tight seal between the sensor element 9 and the signaling device. The chain 6 is attached to a sensor strap 13 which in turn is connected to a permanent magnet 11. The magnet 11 is biased by a mechanical spring 12, and the spring force can be adapted to the weight being used. The position of the magnet is read by a sensor, for instance a Reed relay 10, which in turn gives a signal to the signaling device 9. The signaling device 9 then sends the information regarding the contact of the fishing tackle with the bottom to the vessel. The Reed relay may be replaced by a detector which detects the absolute position of the tension sensor, in order to indicate the degree of bottom contact.

The bottom detector 3, or a plurality thereof, may be attached anywhere on the fishing tackle or the object being dragged above or on the sea bottom.

The invention is not limited to the examples described above, and may be used in conjunction with many devices, for instance on towed or free floating underwater vehicles.

The invention claimed is:

1. A method for detecting the physical contact of an object with a sea bottom, comprising:
   suspending a mass from a chain which is coupled to the object via a tension sensor;
   coupling the mass to tension release means which is fastened to the object remotely from the chain in such a manner that the chain is initially approximately vertical;
   wherein when the mass comes into physical contact with the bottom and the chain becomes slackened, the tension sensor generates a signal indicating the slackening; and
   wherein the tension release means mainly isolates the tension sensor from frictional forces caused by the mass being dragged along the sea bottom.

2. A device for detecting the physical contact of an object with a sea bottom, comprising:
   a tension sensor which is connected to the object;
   a mass which is suspended from a chain that is connected to the tension sensor;
   wherein the tension sensor generates a signal upon the slackening of the chain due to contact of the mass with the sea bottom; and
   tension release means for substantially isolating the tension sensor from frictional forces caused by the mass being dragged along the sea bottom.

3. The device according to claim 2, wherein the tension release means comprises a construction similar to the chain.

4. The device according to claim 2, wherein the mass may be connected at various points along the chain.

5. The device according to claim 2, wherein the chain is coupled to the tension sensor through a weak coupling element.

6. The device according to claim 2, further comprising means for acoustically transmitting the signals from the tension sensor.

7. A device for detecting the physical contact of an object with the sea bottom, the device comprising:
   a tension sensor;
   a mass;
   a first chain which is connected between the tension sensor and the mass;
   a second chain which is connected between the mass and a position which is spaced apart from the tension sensor;
   wherein frictional forces caused by the mass being dragged along the sea bottom are mainly transmitted through the second chain;
   whereby the tension sensor is substantially isolated from the frictional forces.

8. The device of claim 7, wherein the second chain comprises a length such that, when the mass is suspended above the sea bottom, the first chain is substantially vertical.

9. The device of claim 7, wherein the device is connected to a bottom rope of a trawl and the second chain is connected between the mass and the bottom rope.

10. The device of claim 7, wherein the mass may be connected to any of a number of points on the first chain.

11. The device of claim 7, wherein the first chain is connected to the tension sensor through a weak coupling element.

12. The device of claim 7, wherein the tension sensor comprises a signaling device which generates a signal upon contact of the mass with the sea bottom.

\* \* \* \* \*